(12) United States Patent
McArdle et al.

(10) Patent No.: US 6,761,915 B1
(45) Date of Patent: Jul. 13, 2004

(54) REDUCTION OF HEARTBURN EPISODES AFTER INGESTION OF ORANGE JUICE

(75) Inventors: Richard N. McArdle, Bradenton, FL (US); Carla R. McGill, Sarasota, FL (US); Stephen A. Letourneau, Holmes Beach, FL (US); Nancy R. Green, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 10/403,882

(22) Filed: Mar. 31, 2003

Related U.S. Application Data

(63) Continuation of application No. 09/848,523, filed on May 3, 2001, now Pat. No. 6,565,898.

(51) Int. Cl.$^7$ ................................................. A23L 2/02
(52) U.S. Cl. ........................... 426/2; 426/74; 426/599; 424/736
(58) Field of Search ............................. 426/2, 74, 599, 426/616; 424/736, 439

(56) References Cited

U.S. PATENT DOCUMENTS

| | | |
|---|---|---|
| 1,400,191 A | 12/1921 | Wadsworth |
| 2,534,341 A | 12/1950 | Cross |
| 2,631,103 A | 3/1953 | Kirchner et al. |
| 2,712,008 A | 6/1955 | Kirchner et al. |
| 2,834,687 A | 5/1958 | Swisher |
| 3,114,641 A | 12/1963 | Sperti |
| 3,657,424 A | 4/1972 | Aktins et al. |
| 3,723,133 A | 3/1973 | Berry et al. |
| 3,801,717 A | 4/1974 | Huffman ..................... 426/270 |
| 4,439,458 A | 3/1984 | Puri |
| 4,514,427 A | 4/1985 | Mitchell et al. |
| 4,522,836 A | 6/1985 | Dechow et al. |
| 4,551,342 A | 11/1985 | Nakel et al. |
| 4,562,087 A | 12/1985 | Kryger |
| 4,666,721 A | 5/1987 | Norman et al. ............. 426/271 |
| 4,676,988 A | 6/1987 | Efstathiou et al. .......... 426/271 |
| 4,722,847 A | 2/1988 | Heckert |
| 4,738,856 A | 4/1988 | Clark |
| 4,740,380 A | 4/1988 | Melachouris et al. |

(List continued on next page.)

FOREIGN PATENT DOCUMENTS

| | | |
|---|---|---|
| EP | 0 075 114 | 3/1983 |
| GB | 2 095 530 A | 10/1982 |
| JP | 54-8767 | 1/1979 |

OTHER PUBLICATIONS

R. Lyndon, *Commercialisation of Adsorbertechnology in the Fruit Juice Industry*, Bucher–Alimentech Ltd., Auckland, New Zealand, Apr., 1996.

Varsel, "Citrus Juice Processing as Related to Quality and Nutrition", p. 255–271. *Citrus Nutrition and Quality*, A C S Symposiu Series 143, Nagy & Attaway, Ed., Houston, Texas 1980.

PCT International Search Report for PCT/US02/13352.

Feldman and Cora, "Relationships between the acidity and osmolality of popular beverages and reported postprandial hearburn", *Gastroenterology*, vol. 108, pp. 125–131, 1995.

Mowschenson et al., "Effect of hyperparathyroidism and hypercalcemia on lower esophageal sphincter pressure", *American Journal of Surgery*, vol. 143, pp. 36–39, Jan. 1982.

*Primary Examiner*—Carolyn Paden
(74) *Attorney, Agent, or Firm*—Cook, Alex, McFarron, Manzo, Cummings & Mehler, Ltd.

(57) ABSTRACT

Reducing heartburn episodes is achieved in individuals having an orange juice intolerance or food allergy. The orange juice product has a low titratable acidity which combines with a condition resulting after addition of a calcium source such as a calcium citrate source. Individuals prone to orange juice induced heartburn episodes experience a reduced incidence of these heartburn episodes.

21 Claims, 2 Drawing Sheets

U.S. PATENT DOCUMENTS

| | | | |
|---|---|---|---|
| 4,786,510 A | 11/1988 | Nakel et al. | |
| 4,830,862 A | 5/1989 | Braun et al. | |
| 4,834,990 A | 5/1989 | Amer | |
| 4,871,554 A | 10/1989 | Kalala et al. | |
| 4,872,919 A | 10/1989 | Bucher et al. | 134/3 |
| 4,889,739 A | 12/1989 | Powers et al. | |
| 4,919,963 A | 4/1990 | Heckert | |
| 4,938,985 A | 7/1990 | Swaine, Jr. et al. | |
| 4,992,282 A | 2/1991 | Mehanso et al. | |
| 4,994,283 A | 2/1991 | Mehansho et al. | |
| 5,068,109 A | 11/1991 | Foldager et al. | 424/441 |
| 5,108,761 A | 4/1992 | Andon et al. | |
| 5,118,513 A | 6/1992 | Mehansho et al. | |
| 5,186,965 A | 2/1993 | Fox et al. | |
| 5,219,602 A | 6/1993 | Saleeb et al. | 426/250 |
| 5,225,221 A | 7/1993 | Camden et al. | |
| 5,263,409 A | 11/1993 | van Eikeren et al. | |
| 5,389,387 A | 2/1995 | Zuniga et al. | |
| 5,401,524 A | 3/1995 | Burkes et al. | |
| 5,422,128 A | 6/1995 | Burkes et al. | |
| 5,424,082 A | 6/1995 | Dake et al. | |
| 5,445,837 A | 8/1995 | Burkes et al. | |
| 5,474,704 A | 12/1995 | Zaid | |
| 5,474,793 A | 12/1995 | Meyer et al. | |
| 5,500,232 A | 3/1996 | Keating | |
| 5,516,535 A | 5/1996 | Heckert et al. | |
| 5,597,595 A | 1/1997 | DeWille et al. | |
| 5,609,897 A | 3/1997 | Chandler et al. | |
| 5,665,415 A | 9/1997 | Kilgerman et al. | |
| 5,762,962 A | 6/1998 | Georgiades et al. | |
| 5,780,081 A | 7/1998 | Jacobson et al. | |
| 5,834,045 A | 11/1998 | Keating | |
| 5,851,578 A | 12/1998 | Gandhi | |
| 5,869,119 A | 2/1999 | Kilgerman et al. | |
| 5,928,691 A | 7/1999 | Reddy et al. | |
| 5,951,468 A | 9/1999 | Orr | 600/300 |
| 5,989,588 A | 11/1999 | Korn et al. | |
| 6,054,168 A | 4/2000 | Lioutas et al. | |
| 6,063,411 A | 5/2000 | Jacobson et al. | |
| 6,086,927 A | 7/2000 | Frielich et al. | |
| 6,565,898 B2 * | 5/2003 | McArdle et al. | 426/2 |
| 2002/0044974 A1 | 4/2002 | Malcolm | 424/489 |
| 2002/0122866 A1 | 9/2002 | Palaniappan et al. | 426/599 |
| 2003/0218876 A1 * | 11/2003 | McArdle et al. | 426/2 |

* cited by examiner

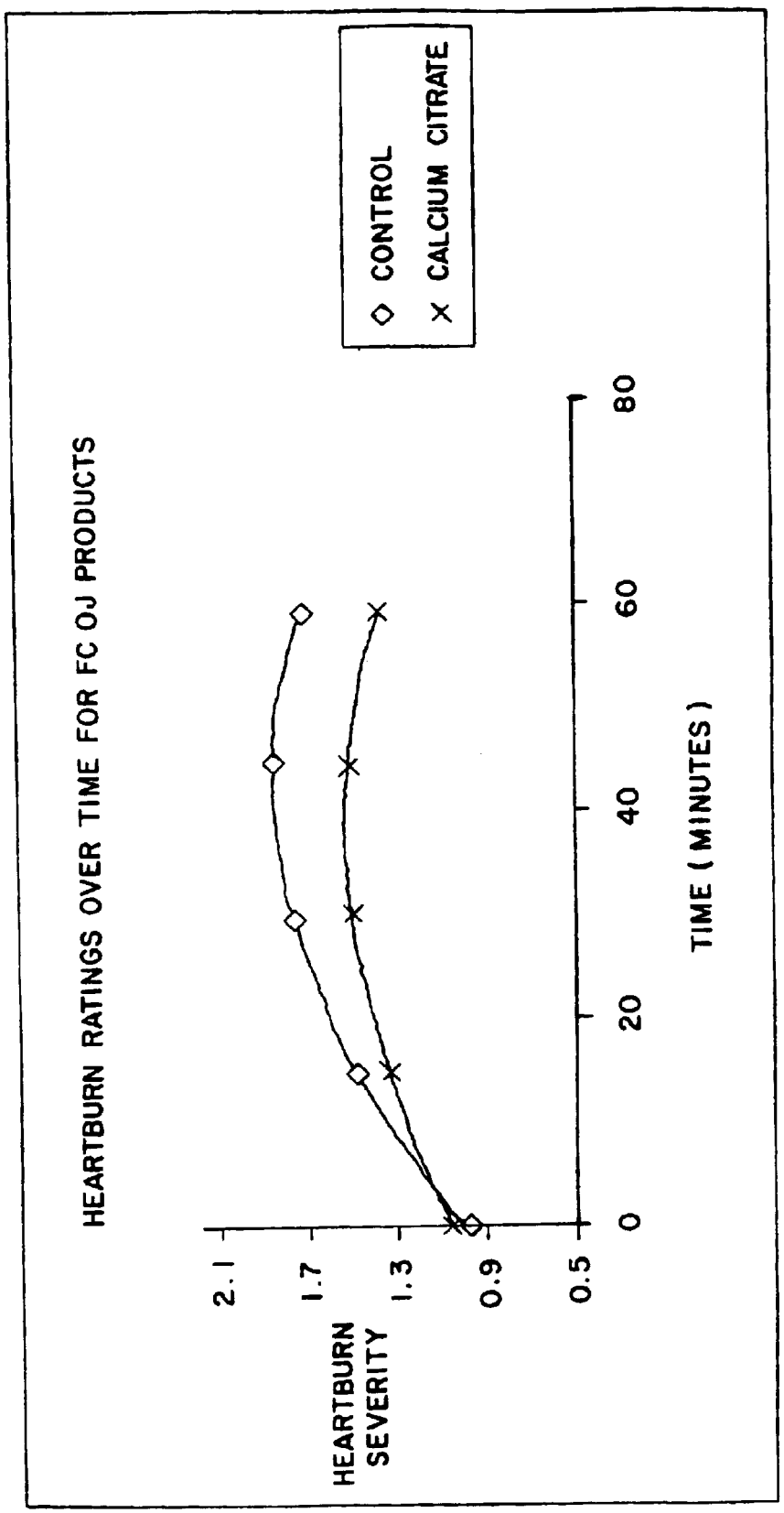

REDUCTION OF HEARTBURN EPISODES AFTER INGESTION OF ORANGE JUICE

DESCRIPTION

This application is a continuation of Ser. No. 09/848,523 filed May 3, 2001 now U.S. Pat. No. 6,565,898.

BACKGROUND OF THE INVENTION

1. Field of Invention

This invention relates to approaches for reducing heartburn episodes when an individual having an orange juice intolerance ingests orange juice according to the invention. The invention is achieved without any substantial negative impact on orange juice flavor or other important attributes. The heartburn reduction is achieved by orange juice which combines the features of being of a lower acid type while incorporating a calcium source such as in the form of a calcium citrate source.

2. Description of Related Art

Numerous individuals have been known to experience negative effects upon ingesting different foods. A true food allergy occurs when the immune system of the individual overreacts to certain proteins in food. It is believed that hundreds of food ingredients can provoke an allergic reaction. Typical foods in this regard are nuts, peanuts, milk, eggs, fish, shellfish, soybeans and wheat. Foods such as these can lead to symptoms including nausea, hives, skin rash, nasal congestion, wheezing, and the like. However, most unpleasant reactions to food are caused not by allergies but by intolerances, which tend to be less severe than true food allergies. Typical in this regard are lactose intolerance, sulfite intolerance and intolerance to monosodium glutamate, red wine, chocolate and food coloring agents. Another intolerance of some frequency is manifested by gastral distress and/or digestive difficulties which certain individuals experience shortly after ingesting orange juice products.

In some circles, it is generally assumed that the relatively high acidity of orange juice products is a primary contributor to these negative or unpleasant experiences with orange juice products for a small percentage of the population. For example, Kligerman et al U.S. Pat. Nos. 5,665,415 and 5,869,119, incorporated hereinto by reference, suggest that acidic foods or beverages such as coffee and other beverages can be combined with calcium glycerophosphate so as to raise the pH of the food or beverage by at least 0.5 pH units, such as to a pH of greater than 5.4, which typically is pH higher than desirable for superior tasting orange juice. This pH adjustment is said to reduce the tendency of the food or beverage to cause heartburn and other esophageal and/or gastrointestinal distress. This approach generally follows the conventional wisdom that ingesting antacids treats heartburn by helping to neutralize stomach acid. This approach suggests, in general, raising the pH of the food or beverage to well above 5.

Other approaches have suggested acid reduction for relieving symptoms such as the burning, painful sensation of heartburn. Included is Georgiades et al. U.S. Pat. No. 5,762,962, incorporated hereinto by reference. This patent is directed to antacid pharmaceutical compositions comprising a combination of calcium salts. Another pharmaceutical is found in Korn et al. U.S. Pat. No. 5,989,588 which suggests administering to a patient for preventing heartburn a composition having a pharmaceutically effective amount of an $H_2$ antagonist such as famotidine. These antacid approaches administer tablets in a manner customary for over-the-counter or pharmaceutical antacid administration.

In addition it is well-known that beverages such as orange juice can be supplemented with calcium with the objective of addressing inadequate calcium in the diets of certain individuals, especially in connection with combating osteoporosis. Numerous approaches have been proposed or implemented in this regard. Included is the technology in patents such as Meyer et al U.S. Pat. No. 5,474,793, Camden et al U.S. Pat. No. 5,225,221, and Heckert U.S. Pat. No. 4,722,847, each incorporated hereinto by reference. These take the approach of adding to fruit juices a source of calcium together with a mixture of citric acid and malic acid. A complex solution is formed and mixed with the juice.

Another calcium fortified beverage approach, this one being for shelf-stable beverages, is found in Keating U.S. Pat. Nos. 5,500,232 and 5,834,045, incorporated hereinto by reference. These add an acidulant and a source of calcium hydroxide and calcium glycerophosphate.

These various approaches do not directly address the problem faced by individuals who wish to alleviate discomfort generally falling under the category of heartburn and which can be associated with drinking orange juice. Previous approaches focus on reducing acidity, either within the juice itself, or by administering antacid tablets in an effort to combat acidity within the digestive tract of the individual drinking the orange juice. Approaches heretofore have not satisfactorily arrived at orange juice products themselves which directly address the incidence of heartburn episodes in those individuals who have an orange juice intolerance, insensitivity or allergy. There accordingly is a need for an approach which is more effective than acidity reduction and that is more convenient and self-contained than is the antacid tablet approach.

SUMMARY OF THE INVENTION

In accordance with the present invention, orange juice itself is provided which reduces the incidence of heartburn episodes in individuals having orange juice intolerance. An orange juice supply is provided and/or modified to be a low-acid orange juice supply having a titratable acid content of not greater than about 0.6 weight percent based upon the total weight of the juice product. A calcium additive such as a calcium citrate source is added to the low-acid orange juice supply so that the calcium concentration within the orange juice product is greater than 0.04 weight percent, based upon the total weight of the orange juice product. Heartburn episodes are reduced for an individual having orange juice intolerance when compared with the incidence of heartburn episodes by that same individual ingesting the orange juice supply which does not include these characteristics.

A general object of the present invention is to provide a method and product for reducing the incidence of heartburn episodes in an individual having an orange juice intolerance.

Another object of the present invention is to provide an approach for reducing heartburn episodes by avoiding the episodes, rather than by administering a treatment agent to the individual, by providing an orange juice product which does not antagonize the individual so that heartburn symptoms develop.

Another object of this invention is to provide an improved method and product for safe ingestion of orange juice without experiencing gastrointestinal discomfort.

Another object of the present invention is to provide a modified orange juice supply having a combination of low titratable acidity and calcium buffering characteristics which produce a situation by which heartburn discomfort by orange juice ingestion is lessened.

Other objects and advantages of the present invention will be understood from the following description according to preferred embodiments of the present invention, relevant information concerning which is shown in the accompanying drawings.

BRIEF DESCRIPTION OF THE DRAWINGS

FIG. 2 is a plot of data of heartburn ratings over time collected during evaluation of certain From Concentrate (FC)orange juice products.

DESCRIPTION OF THE PREFERRED EMBODIMENTS

Figure 1:
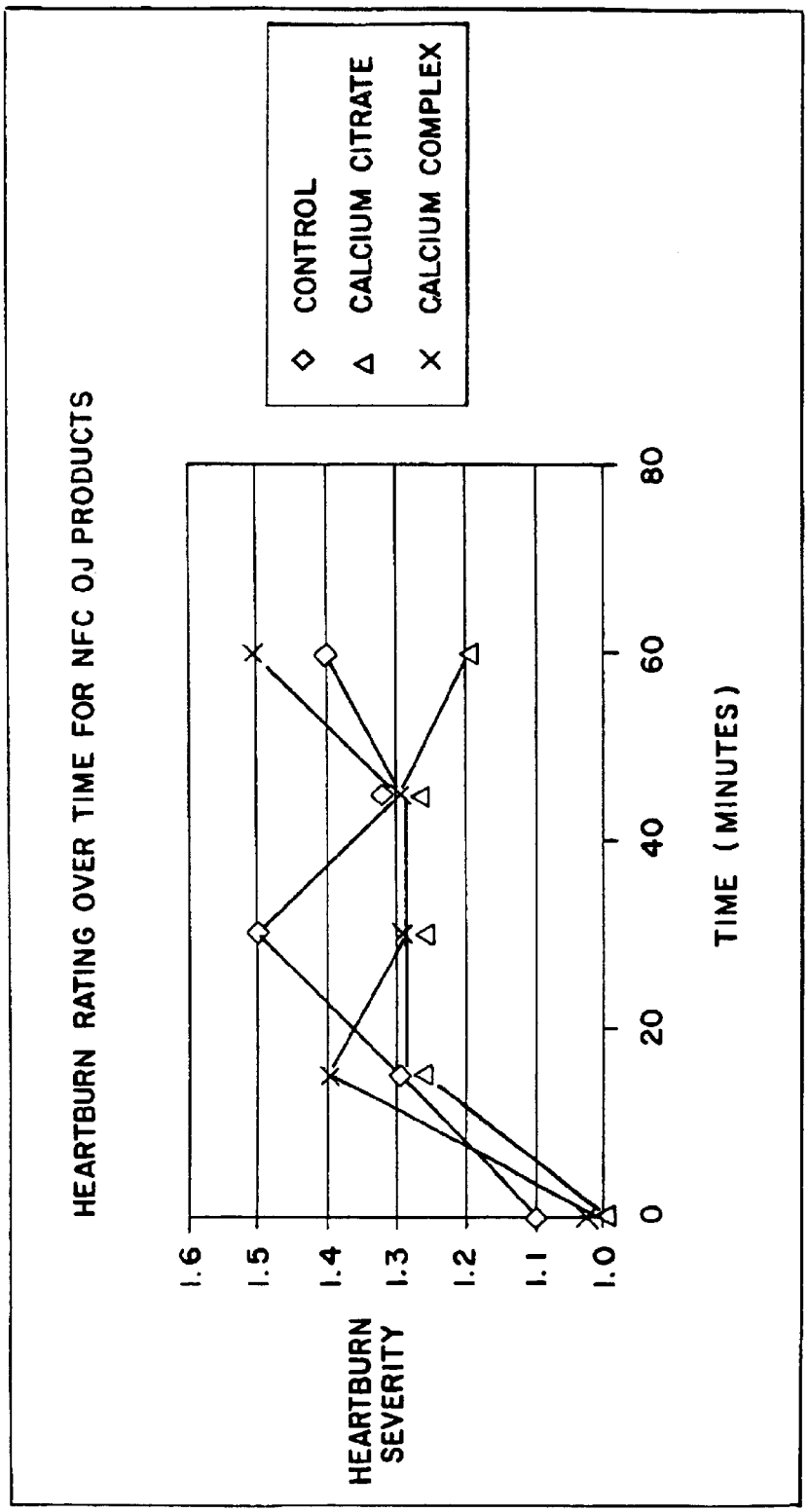
FIG. 1 is a plot of data of heartburn rating over time collected during evaluation of three different formulations of Not From Concentrate (NFC) orange juice.

Orange juice products are provided which have been found to alleviate gastrointestinal distress in individuals which tend to have negative or uncomfortable gastrointestinal experiences upon ingesting orange juice. Such individuals experience post-ingestive symptoms of so-called acid reflux or heartburn. Included in the orange juice products, which are included as an aspect of the invention, is an orange juice supply having low-acid characteristics. The orange juice supply also is further modified in a manner which combines with the low acidity to achieve superior distress relief.

Referring to the low-acid component of the invention, this is expressed in terms of titratable acidity. While the concept of titratable acidity is well-known to those in the art, the preferred test for measuring titratable acidity is the standard method of titration of citric acid with sodium hydroxide.

Although the titratable acidity of orange juice will vary somewhat depending upon the fruit cultivar from which the juice is extracted and the time of the year within the growing season for each cultivar, historically it can be noted that titratable acidity typically varies between about 0.62 and 0.82 for Not From Concentrate orange juices. In most instances, normal titratable acidity values are between about 0.65 and 0.8 for a typical orange juice supply before any processing. In accordance with this invention, the finished juice product will have a titratable acidity of not greater than about 0.6 weight percent. Typically, the titratable acidity will be between about 0.5 and about 0.6 weight percent. An especially advantageous target acidity level is about 0.55 weight percent.

In one aspect of the low-acid characteristic of the invention, the orange juice supply is modified (or selected) without carrying out any specific deacidification process. In accordance with this aspect, at least two different approaches can be practiced. In one approach, the fruit going into the extractor is selected so as to provide juice modified to have the desired titratable acidity. In another approach, the juice stream from the extractor is segregated so as to separate the higher acidity flows from lower acidity flows to provide the modified juice. This typically will include monitoring titratable acidity in the flows so as to provide the modifying of an orange juice supply having the titratable acidity needed to achieve the desired low-acid characteristic in the orange juice product. For example, a Not From Concentrate orange juice can be sourced at a desired titratable acidity, such as 0.58, according to this aspect of the low-acid feature.

Another aspect for modifying the orange juice supply to a low-acid orange juice supply is by proceeding with deacidification of an orange juice supply which has a titratable acidity greater than the titratable acidity to be provided. The deacidification of juice products is well-known in the art. A preferred deacidification approach utilizes ion exchange equipment and procedures. Contact between the juice stream and the ion exchange resin basic moieties reduces the acid level and titratable acidity of the juice contacted by the ion exchange resin bed. Any other suitable deacidification approach likewise can be practiced provided the selected technology achieves the desired titratable acidity level.

It is generally preferred that any of these methods for modifying the orange juice supply to a low-acid orange juice supply, whether using deacidification techniques or not, is carried out prior to additional modification of the juice supply. Generally, this modification is a calcium addition such as a calcium citrate source addition.

Adding a calcium citrate source to the low-acid orange juice supply provides a calcium concentration within the orange juice that is greater than 0.04 weight percent, based upon the total weight of the orange juice. The Ca levels are measured by a standard wet chemistry analysis of titration with ethylene diaminetetracetic acid. While not wishing to be bound by any particular mechanism for achieving the objects herein, it is believed that the calcium citrate source addition has at least two advantageous effects.

One effect is that the calcium source such as a calcium citrate source apparently lowers somewhat the titratable acidity. This can be considered as a mechanism which, together with the low-acid modifying approach, combine to achieve the target low titratable acidity which is selected for the product. For example, an orange juice supply which has a borderline or a slightly elevated titratable acidity can be brought within the needed titratable acidity range by the calcium citrate source addition.

Another mechanism which is believed to occur with the addition of a calcium source such as a calcium citrate source can be loosely characterized as assisting in negating the distress-aggravating effects of the citrus oil content of the juice supply. This is believed to be particularly evident when the citrus oil content of the orange juice supply being used is not lowered substantially by either formulation or processing.

The calcium citrate source typically is provided as a powdered tetrahydrate. Calcium citrate preferably is provided as tricalcium citrate tetrahydrate. It will be appreciated that most orange juice sources already have a relatively low quantity of calcium. The concentration of calcium is increased by the calcium citrate source addition such that the concentration of calcium within the orange juice product is greater than 0.04 weight percent and equal to or less than 0.2 weight percent. It will be appreciated that calcium levels within higher portions of this range can produce juice products which are characterized as containing a calcium supplement. It is not the objective of the calcium citrate source addition to add calcium citrate to levels at or in excess of that which a claim for a calcium supplemented juice can be made. Rather, it is contemplated that calcium levels can be at lower levels. Thus, the advantages of the calcium citrate source addition according to this invention typically are achieved without any need to be as high as that needed to provide a juice which can be labeled as a calcium supplemented orange juice.

In fact, it is generally preferred that the calcium citrate source addition be at a level below that at which taste or other sensory parameters will be affected negatively or will otherwise deviate from a chosen norm. Levels above about 0.065 weight percent calcium in the orange juice product tend to exhibit these effects. Accordingly, when these effects are to be avoided, the calcium content should be below about 0.07 weight percent, more comfortably below about 0.06 weight percent. An especially preferred calcium content range for products according to the invention for many juice sources is between above 0.04 weight percent and below 0.05 weight percent.

Addition of the calcium citrate source into the orange juice supply can be carried out by any conventional means of adding a powdered or particulate product and which is suitable for industrial-scale operations. Typically, a conventional dry solids mixing system is adequate. Generally, there is no need to prepare any calcium solution, such as one that is made up for the addition of a liquid type of calcium additive as a premix or into the orange juice stream.

Without wishing to be bound by any particular theory, it is presently believed that the citrus oil content of an orange juice product is a primary contributor the distress experienced by those individuals having an orange juice intolerance or food allergy, and the calcium citrate source effectively reduces this negative impact. Citrus oil is generally understood in the art as being the component of citrus juice at a concentration measured by the Scott oil method, which is well-known in the citrus juice art. Typically, the Scott oil method detects and measures the effects of compounds which add bromine across double bonds. Typical citrus oil content is primarily a terpene content which originates to a large extent from citrus peel. A typical major terpene in orange juice is d-limonene.

Referring particularly to the method for reducing the incidence of heartburn episodes or other distress experienced by individuals having an orange juice intolerance or allergy, an orange juice supply first is provided. This supply is modified either by selecting an orange juice supply having the low-acid characteristics discussed herein and/or by deacidifying the orange juice supply. A low-acid orange juice supply thus is provided. Adding a calcium source such as a calcium citrate source to the orange juice supply is carried out. A typical orange juice product thus prepared has a pH between, about 3.7 and 4.4.

The resulting orange juice product has characteristics which safeguard and/or insulate the individual from heartburn causation so as to reduce the incidence of heartburn episodes. More particularly, the method achieves a reduction in the incidence of heartburn episodes in an individual having difficulties with orange juice ingestion, this reduction being when compared with the incidence of heartburn episodes by that individual ingesting an orange juice supply which does not have the characteristics of the juice described herein.

This method achieves these effects without significantly detrimentally affecting the sensory attributes of the citrus juice. These sensory attributes include taste and especially mouthfeel of the juice. In most instances, the juice products carrying out the method exhibit a mouthfeel and/or taste which is recognized as being smoother than orange juice not having the characteristics disclosed herein.

Studies were undertaken in order to evaluate the heartburn episode reduction of the method aspects of the invention, as reported in the following Examples.

EXAMPLE 1

Three orange juice products of the not-from-concentrate (NFC) type were prepared in illustrating the invention. They were formulated as follows. Reported percents are rounded to 0.001 percent.

The Control product was a simulated product of 99.9 weight percent of this NFC product and 0.01 volume percent added citrus oil. This NFC control had a typically normal oil level of 0.036 volume percent. This and all other percent concentrations herein are based upon the total volume or weight of the orange juice product, unless otherwise specified. The titratable acidity of the control was 0.063 weight percent, and the control was analyzed as having 11 mg of calcium per 100 mL of juice (about 0.01 weight percent). This Control was heat pasteurized in accordance with usual industry practices. All of the products of this Example were pasteurized and held refrigerated in bottles until use.

The other two test products were prepared from separate portions of the NFC component of the Control. The test juices were formulated so as to prepare juice products based upon a 100 weight percent formulation.

For example, one of the test products was comprised of 99.19 weight percent of the NFC juice, 0.01 volume percent of the same type of added citrus oil, 0.80 weight percent of a so-called calcium citrate malate complex. This is identified as the Calcium Citrate Malate Complex test juice NFC product. It analyzed as having a titratable acidity of 0.71 weight percent, a calcium content of 150.6 mg per 100 ml of juice (about 0.14 weight percent), and 0.032 volume percent citrus oil. No flavor oil was added to the Control NFC juice component. This product formulation included blending appropriate amounts of citric acid, malic acid and calcium hydroxide into the Control NFC.

The remaining test juice is identified as the Calcium Citrate test juice NFC product. This was formulated from 99.33 weight percent of the NFC juice component, 0.01 volume percent of the added citrus oil, and 0.66 weight percent of tricalcium citrate tetrahydrate as the calcium source. This test product had a titratable acidity of 0.58 weight percent, a calcium concentration of 172.3 mg per 100 ml of juice (about 0.16 weight percent), and 0.033 volume percent of the citrus oil.

Healthy male and female adult volunteer subjects were screened for their ability to perceive digestive difficulties with orange juice. Each recruit participated in four screening sessions. After an overnight fast, each subject was provided with 8 ounces of either orange juice or a placebo beverage (apple juice) in a styrofoam cup having an opaque lid and straw to obscure visual difference. Each subject was requested to rate post-ingestive symptoms over one hour at 15 minute intervals. On three of the four screening occasions, the screening beverage was regular orange juice, and on the other occasion, the placebo was the beverage ingested. Individuals who reported symptoms for two of the three orange juice trials and had no reaction to the placebo were admitted to the study. The study had 14 subjects.

The three NFC juice products of this Example were evaluated in duplicate during ten sessions spread over ten days. The qualified subjects recorded their reactions (self-perceived) to each product when tested by placing a mark on a generic human figure representing the area of discomfort for that subject during that test event. At that time, each subject gave the designated symptom a numerical rating. Ratings were recorded when the subjects first ingested each sample and at 15, 30, 45, and 60 minute intervals.

Table I provides chemical analyses of each of the three products which were ingested by the subjects in this study. Also reported is the Mean Response of heartburn symptoms. This illustrates the severity of heartburn symptoms or episodes of all of the test subjects for each of the test orange juice products. Means having the same letter are not significantly different at P<0.05, according to standard least significant differences (LSD) analysis. From these results, the following observation conclusions are reached.

The Calcium Citrate NFC orange juice products showed a decisive statistical significant difference in reduced heartburn symptoms when compared with the Control. The Calcium Citrate Malate Complex having a relatively high acid percentage showed no difference in heartburn response from the Control NFC orange juice.

TABLE I

|  | Control | Calcium Citrate Malate Complex | Calcium Citrate |
|---|---|---|---|
| Brix | 11.7 | 12.4 | 12.1 |
| Acid, % | 0.63 | 0.71 | 0.58 |
| Ratio | 18.54 | 17.51 | 20.8 |
| pH | 3.92 | 4.09 | 4.18 |
| Bottom Solids | 13.0 | 13.0 | 11.0 |
| Oil, % | 0.036 | 0.032 | 0.033 |
| Calcium, mg/100 mL | 11.0 | 150.6 | 172.3 |
| Mean Response | 1.30 ab | 1.30 ab | 1.21 c |

In order to illustrate the effect on heartburn symptoms for these NFC orange juice products, data in this regard are plotted on FIG. 1. This plot tracks the heartburn rating versus minutes after ingestion. It is noted that the Calcium Citrate Malate Complex NFC juice experienced somewhat greater heartburn severity at 15 minutes and spiked at 60 minutes, while the initial severity of heartburn symptoms for the Calcium Citrate NFC orange juice formulation was extremely low initially and never surpassed the 15 minute heartburn severity level. The Control product showed a particularly high increase in severity at 30 minutes and again increased somewhat at 60 minutes.

EXAMPLE 2

Three From Concentrate orange juice products were formulated as follows. In these, all percents were rounded to 0.01%.

A Control FC orange juice was prepared by combining 17.64 weight percent orange juice concentrate (65 brix) with 82.33 weight percent water and 0.03 volume percent added citrus oil. The Control FC orange juice product was a conventional product produced by diluting no-oil added orange juice concentrate with water (to 12.2 brix) and adding orange oil to a concentration of 0.025 volume percent according to the Scott oil method.

A Calcium Citrate FC orange juice product was prepared from 17.49 weight percent of the same concentrate, 81.66 weight percent water, 0.03 volume percent added citrus oil, and 0.82 weight percent of tricalcium citrate tetrahydrate.

A No Solids FC orange juice was prepared by combining 17.64 weight percent of the concentrate with 82.33 weight percent of water, and this was centrifuged to remove bottom solids until a "0" solids analysis was achieved. Thereafter, citrus oil was added at a level of 0.03 volume percent.

The clinical trial procedures discussed in accordance with Example 1 were followed. First, screening was conducted as in Example 1. In this study 20 subjects participated. These FC orange juice products were evaluated in duplicate over eight test sessions in random order, the sessions being separated by at least one day. The qualified subjects recorded their reactions in the manner of Example 1.

The relevant chemical parameters and heartburn response ratings at one hour after ingestion of each type of product are reported in Table II. These responses are reported as Mean Response values.

TABLE II

|  | Control | No Solids | Calcium Citrate |
|---|---|---|---|
| Brix | 12.2 | 12.2 | 12.8 |
| Acid, % | 0.66 | 0.66 | 0.60 |
| Ratio | 18.41 | 18.55 | 21.33 |
| pH | 3.90 | 4.01 | 4.21 |
| Bottom Solids | 10.0 | 0.0 | 10.0 |
| Oil, % | 0.025 | 0.016 | 0.025 |
| Calcium, mg/100 mL | 9.0 | 8.9 | 155.5 |
| Vitamin C, mg./100 mL | 49.3 | 41.6 | 36.0 |
| Limonene, ppm | 113 | 67 | 111 |
| Mean Response | 1.6 a | 1.5 ab | 1.3 b |

The Mean Response values reported in Table II are at one hour after ingestion. Means having the same letter are not significantly different at α=0.01. A standard LSD analysis was used. These Mean Responses indicate that the Calcium Citrate FC orange juice product reported statistically significant reduced heartburn symptoms relative to the Control FC product. This benefit was attained in an FC orange juice having a high oil content, the oil content of the Calcium Citrate FC product being as high as that of the Control. These Mean Responses also indicate that the No Solids FC product was not associated with a statistically significant reduced heartburn result, even though limonene levels were about half of the other products and there were no solids. Of course, no calcium source was added.

FIG. 2 provides an indication of the consistency of the heartburn severity reduction over the rating time intervals for the Calcium Citrate product versus the Control FC product.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method for reducing the incidence of heartburn episodes in an individual having an orange juice intolerance, comprising the steps of:

providing a low-acid orange juice supply having a titratable acidity which is not greater than about 0.6 weight percent, based on the total weight of the orange juice supply;

adding a calcium citrate source to said low-acid orange juice supply to provide an orange juice product having a calcium content of greater than about 0.04 weight percent, based upon the total weight of the orange juice product, thereby providing an orange juice having heartburn-safeguarding characteristics; and ingesting said orange juice product having heartburn-safeguarding characteristics by an individual having an orange juice intolerance such that the incidence of heartburn episodes by that individual is reduced over the incidence of heartburn episodes by said individual ingesting an orange juice having a titratable acidity greater than about 0.6 weight percent and a calcium concentration less than about 0.04 weight percent, each weight percent being based upon the total weight of the orange juice supply.

2. The method of claim 1, wherein the orange juice product having heartburn-safeguarding characteristics of said ingesting step has a titratable acidity of between about 0.5 and about 0.6 weight percent, based upon the total weight of the orange juice supply.

3. The method of claim 1, wherein the low-acid orange juice supply of said adding step has a titratable acidity of between about 0.5 and about 0.6 weight percent, based upon the total weight of the orange juice supply.

4. The method of claim 1, wherein the adding step adds tricalcium citrate tetrahydrate as the calcium citrate source.

5. The method of claim 4, wherein the tricalcium citrate tetrahydrate is added by said adding step as dry solid particulates.

6. The method of claim 1, wherein the adding step adds the calcium citrate source as dry solid particulates into the orange juice supply.

7. The method of claim 1, wherein after said adding step the calcium concentration of the orange juice product having heartburn-safeguarding characteristics is not greater than about 0.2 weight percent, based upon the total weight of the orange juice.

8. An orange juice product produced in accordance with the method of claim 1, wherein the orange juice product has said heartburn-safeguarding characteristics.

9. A method for reducing the incidence of heartburn episodes in an individual having an orange juice intolerance, comprising the steps of:

providing a low-acid orange juice supply having a titratable acidity which is not greater than about 0.6 weight percent, based on the total weight of the orange juice supply;

adding to said orange juice supply a calcium source;

said low-acid orange juice supply and said calcium source combine to provide an orange juice having heartburn-safeguarding characteristics; and ingesting said orange juice product having heartburn-safeguarding characteristics by an individual having an orange juice intolerance such that the incidence of heartburn episodes by that individual is reduced over the incidence of heartburn episodes by said individual ingesting an orange juice having a titratable acidity greater than about 0.6 weight percent and a calcium concentration less than about 0.04 weight percent, each weight percent being based upon the total weight of the orange juice supply.

10. The method of claim 9, wherein the orange juice product having heartburn-safeguarding characteristics of said ingesting step has a titratable acidity of between about 0.5 and about 0.6 weight percent, based upon the total weight of the orange juice supply.

11. The method of claim 9, wherein the low-acid orange juice supply of said adding step has a titratable acidity of between about 0.5 and about 0.6 weight percent, based upon the total weight of the orange juice supply.

12. The method of claim 9, wherein the adding step adds tricalcium citrate tetrahydrate as the calcium source.

13. The method of claim 12, wherein the tricalcium citrate tetrahydrate is added by said adding step as dry solid particulates.

14. The method of claim 9, wherein the adding step adds the calcium source as dry solid particulates into the orange juice supply.

15. The method of claim 9, wherein after said adding step the calcium concentration of the orange juice product having heartburn-safeguarding characteristics is not greater than about 0.2 weight percent, based upon the total weight of the orange juice.

16. An orange juice product produced in accordance with the method of claim 9, wherein the orange juice product has said heartburn-safeguarding characteristics.

17. An orange juice product having heartburn safeguarding characteristics when ingested by an individual having an orange juice intolerance, comprising: a low-acid orange juice product containing a calcium citrate source, the orange juice product having:

(a) a titratable acidity which is not greater than about 0.6 weight percent, based upon the total weight of the orange juice product;

(b) a calcium citrate component such that the calcium concentration is greater than about 0.04 weight percent, based upon the total weight of the orange juice product; and (c) heartburn-safeguarding characteristics when ingested by an individual having an orange juice intolerance such that the incidence of heartburn episodes by that individual is reduced over the incidence of heartburn episodes by said individual ingesting another orange juice product having a titratable acidity greater than about 0.6 weight percent, based upon the total weight of the product, and having no said calcium citrate component.

18. The product of claim 17, wherein the orange juice product having heartburn-safeguarding characteristics has a titratable acidity of between 0.5 and 0.6 weight percent, based upon the total weight of the orange juice product.

19. The product of claim 17, wherein the calcium concentration of the orange juice product is not greater than 0.2 weight percent, based upon the total weight of the orange juice product.

20. The product of claim 17, wherein said product having heartburn safeguarding characteristics achieves said characteristics without detrimentally affecting positive sensory attributes of the orange juice.

21. The product of claim 17, wherein said product exhibits a mouthfeel which is smoother than orange juice not having said heartburn-safeguarding characteristics.

* * * * *

UNITED STATES PATENT AND TRADEMARK OFFICE
CERTIFICATE OF CORRECTION

PATENT NO. : 6,761,915 B1
DATED : July 13, 2004
INVENTOR(S) : Richard N. McArdle et al.

It is certified that error appears in the above-identified patent and that said Letters Patent is hereby corrected as shown below:

Title page,
Item [56], References Cited, U.S. PATENT DOCUMENTS, delete "Kirchner et al." insert -- Kermer --;
"5,665,415" reference, delete "Kilgerman" insert -- Kligerman --.
"5,869,119" reference, delete "Kilgerman" insert -- Kligerman --.
OTHER PUBLICATIONS, "Varsel," reference, delete "Symposiu" insert -- Symposium --.

Column 1,
Line 49, delete "units" insert -- unit --.

Column 5,
Line 19, after "contributor" insert -- to --.

Signed and Sealed this

Thirtieth Day of November, 2004

JON W. DUDAS
*Director of the United States Patent and Trademark Office*